UNITED STATES PATENT OFFICE.

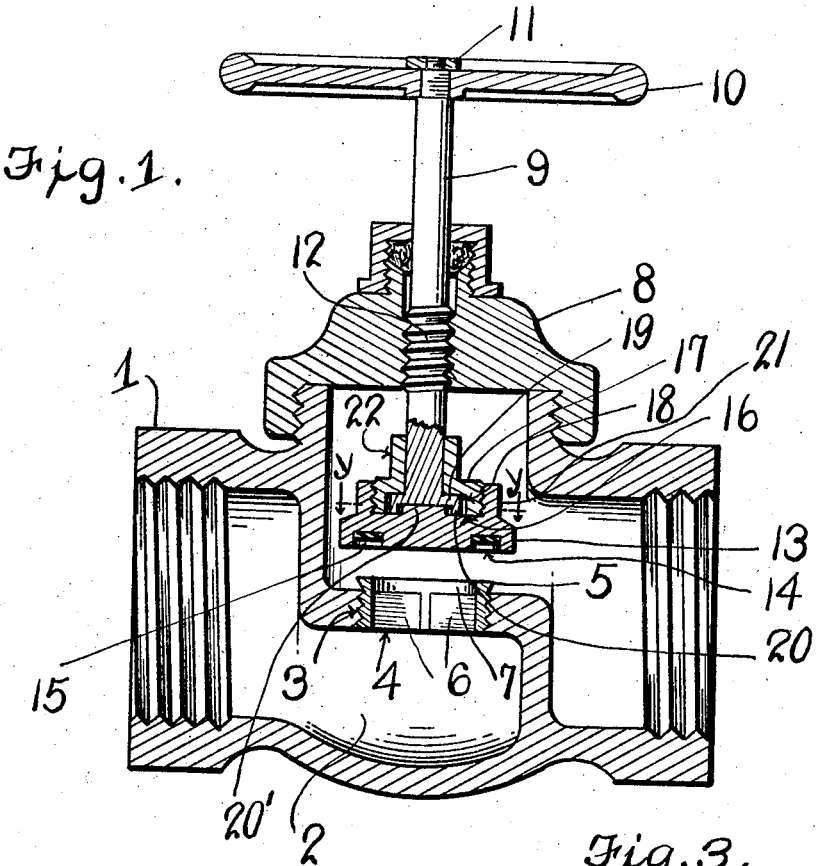

WILLIAM ALONZO ATTEBERRY, OF COWETA, OKLAHOMA, ASSIGNOR OF ONE-FOURTH TO O. A. SEWELL AND ONE-FOURTH TO P. A. FOX, BOTH OF COWETA, OKLAHOMA.

VALVE.

1,346,737.           Specification of Letters Patent.     Patented July 13, 1920.

Application filed April 5, 1919. Serial No. 287,713.

*To all whom it may concern:*

Be it known that I, WILLIAM A. ATTEBERRY, a citizen of the United States, residing at Coweta, in the county of Wagoner and State of Oklahoma, have invented new and useful Improvements in Valves, of which the following is a specification.

This invention relates to valves, the object in view being to produce an improved valve structure adapted especially for valves of the type known as globe, angle, throttle, and check valves, and compression bibs. It will be apparent however as the description proceeds, that the improved structure is applicable to valves of various kinds and for various purposes where a true, accurate and fluid tight fitting of the valve against its seat is necessary and where it is required to renew the valve and valve seat from time to time as said parts become worn.

With the above and other objects in view, the invention consists in the novel construction, combination and arrangement, herein fully described, illustrated and claimed.

In the accompanying drawings:

Figure 1 is a diametrical section through the improved valve.

Fig. 2 is a plan view of the valve body complete.

Fig. 3 is a plan view of the valve seat.

Fig. 4 is a cross section through the valve seat on the line $xx$ of Fig. 3.

Fig. 5 is a fragmentary section through the valve body on the line $yy$ of Fig. 1.

The valve as a whole is illustrated in the drawings as comprising a valve casing 1 having oppositely disposed inlet and outlet openings as shown, the valve casing being of a well known type now in common use, and being provided with an interior 2, divided by a partition wall which in carrying out the present invention is provided with a threaded bore 3.

4 designates a valve seat of annular formation, the same being externally threaded and screwed into the threaded bore 3 as shown in Fig. 1 enabling said valve seat to be removed and renewed as frequently as may become necessary. The valve seat 4 is provided with an enlarged beveled shoulder 5 adapting the same to be tightly seated with a fluid tight joint in the threaded opening 3 and said valve seat 4 is provided with internally arranged relatively fixed segmental shaped portions 6 having straight or flat inner surfaces as best illustrated in Fig. 3, said segments together forming a non-circular or angular opening 7 adapted to receive a wrench for the purpose of tightly screwing the valve seat into place or removing the same therefrom when it becomes necessary to use a new valve seat. It will be noted that the segmental shaped portions 6 are offset from the working face of the valve seat 4 so as not to interfere with the proper seating of the valve body thereon.

Extending through the threaded and removable cap 8 of the valve casing is a valve stem 9 having the upper end thereof squared and a handle 10 shown in the form of a wheel with a central squared opening fitted thereon and held in place by means of a nut 11. The stem 9 is threaded through the cap 8 as shown at 12 to provide for adjusting the valve body hereinafter described toward and away from the seat 4.

The valve body comprises a main section 13 formed in the working face thereof with an annular groove 14 in which is an inlay or gasket 15 preferably of hard rubber or other suitable material, the same being adapted to contact directly with the working face of the valve seat 4. The main section of the valve body is formed in the face opposite the valve face thereof with a circular recess 16, the same being threaded to receive a coupling section 17, the latter being screwed into the main section of the valve body as shown in Fig. 1 and surrounding the valve stem 9. The sections of the valve are shaped to provide an inclosed internal cavity 18 in which is rotatably received a disk shaped flange or head 19 on the inner end of the valve stem 9. Said head 19 is provided with an annular centering flange or rim 20 which surrounds a central circular boss 20' on the adjacent side of the main section of the valve body, pressure being thereby brought against the main body section of the valve by the end portion of the valve stem 9 and the valve body thus being pressed tightly against the valve seat 4 and being able to accommodate itself accurately thereto. Attention is called to the fact that the depth of the recess 16 is such with relation to the threaded portion of section 17 that the latter will engage the bottom of the recess before the head 19 is clamped tight enough to prevent free movement thereof. The valve body section 13 is provided with a number of flat surfaces 21 to adapt the same to be engaged by a wrench, and the coupling section 17 is likewise provided with flat faces 22 adapting the same to be engaged by a wrench. This provides for disconnecting the sections of the valve body from each other, and the section 13 from the valve stem when the renewal of the valve body or any part thereof is required.

In assembling the parts of my improvement, the coupling section 17 is slipped on the lower portion of the stem 9 prior to the provision of the head 19 on the inner end of said stem 9 in any of the ways well known in the metal-working art.

Having thus described my invention I claim:—

1. In a valve, the combination of a stem, of circular form in cross-section, having a circular flanged head at its inner end; and a body comprising a main section having an outer portion interiorly threaded and exteriorly of angular form in cross-section for the application of a wrench and also having an interior central circular boss disposed in the head of the stem, and a coupling section having an outer portion revolubly mounted on the stem and exteriorly of angular form in cross-section for the application of a wrench and also having a portion surrounding the head on the stem and exteriorly threaded and disposed in and engaged with the interiorly threaded portion of the main section.

2. The combination of a valve casing having an interior portion in which is a threaded bore, a valve body movable in the casing and toward and from said interior portion and having a circular groove in its face adjacent to said portion and a gasket in said groove, and a circular exteriorly-threaded valve seat with an angular hole therein, disposed in the threaded bore of the interior body portion and having at its outer end an enlarged beveled shoulder tightly seated in said bore and projecting outwardly from the interior casing portion and adapted to be received in the groove of the valve body and engaged with the gasket in said groove.

In testimony whereof I affix my signature.

WILLIAM ALONZO ATTEBERRY.